(12) United States Patent
Kellens et al.

(10) Patent No.: US 8,203,014 B2
(45) Date of Patent: Jun. 19, 2012

(54) FRACTIONATION PROCESSES AND DEVICES FOR OILS AND FATS

(75) Inventors: Marc Kellens, Muizen (BE); Marc Hendrix, Balen (BE)

(73) Assignee: N.V. de Smet Engineering S.A., Zaventem (BE)

( * ) Notice: Subject to any disclaimer, the term of this patent is extended or adjusted under 35 U.S.C. 154(b) by 912 days.

(21) Appl. No.: 12/175,837

(22) Filed: Jul. 18, 2008

(65) Prior Publication Data
US 2009/0264667 A1  Oct. 22, 2009

Related U.S. Application Data

(63) Continuation-in-part of application No. PCT/EP2007/000499, filed on Jan. 22, 2007.

(30) Foreign Application Priority Data

Jan. 20, 2006 (EP) ..................................... 06001195

(51) Int. Cl.
*C07C 51/43* (2006.01)
(52) U.S. Cl. ....................................................... 554/211
(58) Field of Classification Search .................... 554/211
See application file for complete search history.

(56) References Cited

U.S. PATENT DOCUMENTS

| | | |
|---|---|---|
| 1,988,648 A | 1/1935 | Engelke |
| 2,461,694 A | 2/1949 | McCubbin et al. |
| 2,470,652 A | 5/1949 | Scofield |
| 2,571,143 A | 10/1951 | Leslie |
| 2,674,609 A | 4/1954 | Beal et al. |
| 2,678,327 A | 5/1954 | Clayton |
| 2,691,830 A | 10/1954 | Karnofsky |
| 2,713,023 A | 7/1955 | Irvine |
| 2,746,168 A | 5/1956 | Rickabaugh |
| 2,804,427 A | 8/1957 | Suriano |
| 2,826,601 A | 3/1958 | Barsky |
| 2,983,612 A | 5/1961 | Eichberg |
| 3,310,487 A | 3/1967 | Johnson et al. |
| 3,367,044 A | 2/1968 | Fitch |
| 3,389,974 A | 6/1968 | Barattini et al. |
| 3,392,455 A | 7/1968 | Klingsbaker, Jr. et al. |
| 3,634,201 A | 1/1972 | Kehse |

(Continued)

FOREIGN PATENT DOCUMENTS

BE          877839          * 1/1980

(Continued)

OTHER PUBLICATIONS

Office Action issued in German Patent Application No. 11 2007 000 184.4-44.

(Continued)

*Primary Examiner* — Deborah D Carr
(74) *Attorney, Agent, or Firm* — Wecman, Hessler & Vanderburg

(57) ABSTRACT

The invention provides operating the dry or solvent fractionation of oils and fats in a crystallizer comprising a crystallization vessel (1,2), an agitator, cooling means and a drive, wherein said drive provides said agitator with an oscillating motion, and/or a rotating motion around an axis, with the proviso that each point of said agitator moves at substantially the same linear speed.

The invention also provides a crystallizer comprising a crystallization vessel (1,2) having a polygonal cross-section, an agitator and a drive, wherein said drive provides said agitator with an oscillating motion, and wherein said agitator is not inclined to the moving direction.

23 Claims, 8 Drawing Sheets

U.S. PATENT DOCUMENTS

| | | | |
|---|---|---|---|
| 3,966,445 A | 6/1976 | Adams et al. |
| 4,049,686 A | 9/1977 | Ringers et al. |
| 4,089,880 A | 5/1978 | Sullivan |
| 4,138,230 A | 2/1979 | Thompson |
| 4,164,506 A | 8/1979 | Kawahara et al. |
| 4,415,443 A | 11/1983 | Murphy |
| 4,601,790 A | 7/1986 | Stage |
| 4,664,784 A | 5/1987 | Harandi |
| 4,778,489 A | 10/1988 | Weber |
| 4,996,072 A | 2/1991 | Marschner et al. |
| 5,041,245 A | 8/1991 | Benado |
| 5,214,171 A | 5/1993 | Dijkstra et al. |
| 5,401,867 A | 3/1995 | Sitzmann et al. |
| 5,486,318 A | 1/1996 | McKeigue et al. |
| 6,001,220 A | 12/1999 | Hillström et al. |
| 6,013,817 A | 1/2000 | Stern et al. |
| 6,127,560 A | 10/2000 | Stidham et al. |
| 6,172,247 B1 | 1/2001 | Copeland et al. |
| 6,172,248 B1 | 1/2001 | Copeland et al. |
| 6,426,423 B1 | 7/2002 | Copeland et al. |
| 6,623,604 B1 | 9/2003 | Elsasser et al. |
| 6,658,851 B2 | 12/2003 | Jellema et al. |
| 6,953,499 B2 | 10/2005 | Kellens et al. |
| 2002/0169033 A1 | 11/2002 | Sery |
| 2003/0070317 A1 | 4/2003 | Anderson et al. |
| 2005/0066823 A1 | 3/2005 | Kellens et al. |
| 2006/0030012 A1 | 2/2006 | Kellens et al. |
| 2006/0057263 A1 | 3/2006 | Kellens et al. |
| 2008/0051599 A1 | 2/2008 | Adami et al. |
| 2008/0081097 A1 | 4/2008 | Kellens et al. |

FOREIGN PATENT DOCUMENTS

| | | | |
|---|---|---|---|
| BE | 1005617 | * | 11/1993 |
| BE | 1005617 A3 | | 11/1993 |
| DE | 382912 | | 10/1923 |
| DE | 552532 | * | 6/1932 |
| DE | 1285983 | | 1/1969 |
| DE | 2524545 A1 | | 12/1975 |
| DE | 2902235 | | 1/1978 |
| DE | 265074 A1 | | 2/1989 |
| DE | 4132892 | | 4/1991 |
| DE | 19520675 A1 | | 12/1996 |
| EP | 0195991 A2 | | 10/1986 |
| EP | 0520097 A1 | | 12/1992 |
| EP | 1157615 A2 | | 11/2001 |
| EP | 1505145 B1 | | 6/2006 |
| EP | 1624047 B1 | | 10/2006 |
| EP | 1637201 B1 | | 8/2007 |
| EP | 1818088 A1 | | 8/2007 |
| EP | 1894913 A1 | | 3/2008 |
| EP | 1905815 A1 | | 4/2008 |
| FR | 2103267 | | 4/1972 |
| GB | 589534 | | 6/1947 |
| GB | 777413 | | 6/1957 |
| GB | 789777 | | 1/1958 |
| GB | 816522 | | 7/1959 |
| GB | 1229266 | | 4/1971 |
| GB | 1400836 | | 7/1975 |
| GB | 1424049 | | 2/1976 |
| GB | 1429773 | | 3/1976 |
| GB | 1495196 | | 12/1977 |
| GB | 1561494 | | 2/1980 |
| GB | 2100613 | * | 1/1983 |
| GB | 2100613 A | | 1/1983 |
| GB | 2176713 A | | 1/1987 |
| GB | 2451577 A | | 2/2009 |
| JP | 7-284643 | | 10/1995 |
| JP | 2002/210399 A | | 7/2002 |
| WO | WO 86/04603 A1 | | 8/1986 |
| WO | WO 99/53001 A1 | | 10/1999 |
| WO | WO 02/062157 A2 | | 8/2002 |
| WO | WO 2005/100519 A1 | | 10/2005 |
| WO | WO 2007/082766 A1 | | 7/2007 |

OTHER PUBLICATIONS

Swedish Office Action issued Feb. 8, 2010 for related Swedish Patent Application No. 0801581-0. 4 pages.
Office Action (U.S. Appl. No. 10/912,361), mailed Nov. 13, 2008.
British Examination Report issued Oct. 25, 2010 for related British Patent Application No. GB0814455.2.
D4049-GB, Application No. GB0814455.2, Examination Report under Section 18(3) dated May 11, 2011, 2 pages.
D4049-GB, Application No. GB0814455.2, Examination Report under Section 18(3) dated May 18, 2010, 2 pages.
U.S. Appl. No. 12/175,859, filed Jul. 18, 2008, Van Damme.
Andersen, *Refining of Oils and Fats*, 2nd Ed., Pergamon Press, United Kingdom, 1962, pp. 187-199.
Erickson, *Practical Handbook of Soybean Processing and Utilization*, AOCC Press, Champaign, IL, 1995, pp. 246-249.
Kuroda et al., "An Edible Oil Deodorizer with a Direct-Fired Heater," *J. Am. Oil Chem. Soc.* 66:1781-1783, 1989.
Minifie et al., *Chocolate, Cocoa, and Confectionery, Science and Technology*, 2nd Ed., AVI Publishing Company, Inc., Westport, CT, 1980, pp. 67-88.
O'Brien et al., *Introduction to Fats and Oils Technology*, 2nd Ed., AOCS Press, Champaign, IL, 2000, pp. 256-258.
Van Gerpen et al., *Biodiesel Production Technology*, U.S. Department of Commerce, Jul. 2004.
Weber et al., "Fat Crystallizers with Stirring Surfaces: Theory and Practice," *OCL Oléagineux* 5:381-384, 1998.
English Language Explanation of BE 877,839, 1980.
English Language Explanation of BE 1005617 A3, 1993.
English Language Explanation of DE 552,532, 1932.
English Language Explanation of DE 19520675 A1, 1975.
English Language Explanation of JP 7-284643, 1995.
English Language Explanation and Machine Translation of JP 2002/210399 A.
European Search Report for European Patent Application No. 06001195 completed Jun. 9, 2006.
European Search Opinion for European Patent Application No. 06001195 completed Jun. 9, 2006.
Communication in European Patent Application No. 06001195 mailed Jan. 24, 2008.
European Search Report for European Patent Application No. 04077550 completed Feb. 17, 2005.
European Search Report for European Patent Application No. 06017333 completed Feb. 23, 2007.
European Search Report for European Patent Application No. 06020388 completed Mar. 28, 2007.
European Search Report for European Patent Application No. 07075709 completed Nov. 21, 2007.
European Search Report for European Patent Application No. 07075840 completed Jan. 29, 2008.
International Search Report for PCT/EP2007/000499 completed May 29, 2007.
International Preliminary Report on Patentability for PCT/EP2007/000499 completed May 29, 2007.
Written Opinion of the International Searching Authority for PCT/EP2007/000499 completed May 29, 2007.
Invitation to Correct Defects in the International Application for PCT/EP2007/000499 mailed Feb. 2, 2007.
Response to the Invitation to Correct Defects in the International Application for PCT/EP2007/000499 mailed May 7, 2007.
Office Action (U.S. Appl. No. 10/912,361), mailed Mar. 19, 2008.
Office Action (U.S. Appl. No. 11/198,084), mailed Dec. 3, 2007.
Office Action (U.S. Appl. No. 11/198,084), mailed Jul. 9, 2008.
Office Action (U.S. Appl. No. 11/226,758), mailed Aug. 18, 2008.
Office Action (U.S. Appl. No. 11/841,255), mailed Sep. 19, 2008.

* cited by examiner

US 8,203,014 B2

FRACTIONATION PROCESSES AND DEVICES FOR OILS AND FATS

CROSS-REFERENCE TO RELATED PATENT APPLICATIONS

This application is a continuation-in-part of International Application Number PCT/EP2007/000499 filed Jan. 22, 2007, which, in turn, claims the benefit of European Application No. 06001195.4 filed Jan. 20, 2006. Each of the aforementioned applications is hereby incorporated by reference.

FIELD OF THE INVENTION

The invention relates to fractional crystallization processes for oils and fats that aim at producing crystal slurries as well as to the crystallizers to be used in said crystallization processes.

BACKGROUND TO THE INVENTION

In the chemicals and foods industries, fractional crystallization processes are regularly used to purify intermediate products and/or to isolate fractions having more desirable properties than their starting materials. These starting materials can thereto be dissolved in a solvent to provide a solution that is then subjected to a fractional crystallization process. They can also be melted whereupon the melt is then partially crystallised. During such crystallization processes, the temperature of the solution or melt is lowered causing the solution or melt to become supersaturated and generate crystal nuclei. On further cooling, these nuclei grow into macroscopic crystals and form a crystal slurry. This slurry is then subjected to a separation process which can be a continuous process using a drum filter, a continuous band filter, a sieve centrifuge or a decanter, or it can be a discontinuous separation process employing a filter press such as a plate and frame or a membrane filter press. In the fractionation of edible oils and fats, such membrane filter presses are now standard equipment (Th. Willner and K. Weber, "High-pressure dry fractionation for confectionery fat production", *Lipid Technology* vol. 6, pages 56-60, 1994).

An advantage of such membrane press filters is that they leave relatively little interstitial oil between the fat crystals and thus generate a relatively pure filter cake. Other ways of achieving same, involve using a solvent, which will dilute the interstitial oil, and especially washing the filter cake with clean solvent to dilute the interstitial solution even further. So whereas for the fractionation of edible oils and fats the so-called 'dry fractionation process' is generally preferred since it does not involve the use of highly inflammable solvents such as acetone or hexane, some products can only be obtained by using solvents during their fractional crystallization.

In the dry fractionation process, the fat to be fractionated is melted and then cooled in a crystallizer to produce a slurry of fat crystals in its mother liquor. This slurry is then separated into a filtrate that is commonly referred to as the 'olein fraction' and a filter cake that is called the 'stearin fraction'. The properties of the olein mainly depend upon the final crystallization temperature whereas the properties of the stearin fraction depend only slightly on this temperature but strongly on its olein content.

For the industrial dry fractionation of edible oils and fats, a batch crystallization process is generally preferred despite the fact that a continuous process is likely to be considerably cheaper. Such batch processes allow of better control of the crystallization process parameters such as temperature and intensity of agitation. In addition, such batch processes have the advantage over continuous processes in that the temperature of the batch crystallizer is raised above the melting point of the feedstock during each batch cycle. Accordingly, any crystal deposits on the crystallizer walls or cooling elements will be removed by being melted and no special wipers to clean these surfaces such as for instance described in U.S. Pat. No. 6,355,218 are needed.

A simple batch crystallization vessel used for the dry fractionation of edible oils and fats is the so-called "tubular crystallizer". This is a tall, cylindrical, double-walled vessel fitted with a central, axial agitator. Heat transfer is through the vessel wall and to ascertain a cooling surface of e.g. 7 $m^2$ per $m^3$ crystallizer volume, the diameter of such tubular crystallizers has to be limited to 0.6 m at most. Since agitators that are longer than 5 m would require an extra sturdy execution, the volume of this type of crystallizer is in practice limited to approximately 1.4 $m^3$; it is therefore mainly used for low-volume specialty fats, and less for bulk products such as palm oil.

For the fractionation of for example palm oil, large crystallization vessels are usually needed and various ways of providing additional cooling surface have been developed (see FIG. 11.8 at page 200 in *Introduction to Fats and Oils Technology*, R. D. O'Brien, W. E. Farr and P. J. Wan Eds. AOCS Press, Champaign, Ill.). These can entail cooling coils winding their way inside the crystallization vessel from bottom to top (F. Tirtiaux, "Le fractionnement industriel des corps gras par crystallization dirigée—procédé Tirtiaux" in *Oléagineux* (1976) 31:279-285), whereby a specially designed central agitator ensures both homogeneity of the temperature inside the vessel and prevents crystals from depositing. However, the agitating action in this construction does not extend right to the bottom of the cylindrical vessel. This may cause crystals to settle at the bottom and stay behind when the vessel is emptied. Similarly, crystals may also stay behind between the cooling coils and the vessel wall and on top of the cooling coils. This is the problem that also faces the crystallizer described for use in a batch process in Belgian Patent No. 1,005,617.

This problem has been partially overcome by fitting first vertical cooling tubes and then vertical cooling fins instead of tubes inside the vessel and so avoiding crystals to stay behind on top of the heat exchanger elements. Moreover, by directing the flow of oil towards those fins, a good heat transfer coefficient of some 70-100 W/$m^2$K is ascertained. However, the problem of incomplete emptying of the vessel once the liquid level has dropped below the lowest agitator blade remains.

A substantial increase in cooling surface per unit volume of oil has been realised in a crystallizer comprising concentric annular crystallization compartments that are separated by concentric, annular, double-walled cooling elements. In addition, this type of crystallizer also exhibits an increased heat transfer coefficient of about 120-170 W/$m^2$K presumably because the agitator blades move very close to the heat exchange surfaces. However, this type of crystallizer is complex in construction and therefore expensive to build. Because the agitator blades are mounted on spokes connected to a central agitator shaft and move inside the annular compartments, these must be perfectly circular to prevent the blades from scraping the walls. Besides, including a labyrinth inside the double-walled cooling elements is not easy. The problem of incomplete emptying has been solved by emptying the crystallizer as rapidly as possible into an intermediate storage vessel from where the separation equipment is being fed. This rapid emptying has the advantage that it allows more batches to be crystallised in a given time period and thus to make more effective use of an expensive piece of equipment.

Finally, a totally different solution to the problem of increasing the cooling surface per unit of volume, and especially increasing the heat transfer coefficient, is presented by the STAR-crystallizer shown in FIG. 2 of K. Weber et al. "Fat crystallizers with stirring surfaces: theory and practice" in OCL (1998) 5(5):381-384. This crystallizer is provided with an agitator that is an assembly of tubes that form a conduit for the heat exchange medium (cooling water). The assembly rotates and the rotation is eccentric. Heat transfer coefficients as high as 300 W/m$^2$K have been measured for this type of apparatus on liquid oil.

All the prior art crystallizers described above have in common that they are provided with rotating agitators the various points of which do not move at substantially the same linear speed. Accordingly, the agitation within these crystallizers is far from uniform in that the linear velocities (speeds) of various points of the agitator vary widely according to their distance to the axis of rotation. In a cylindrical crystallization vessel with a diameter of 4 m, the agitator tip speed will be already 3 m/s when the agitator rotates 15 times per minute but close to the agitator axis, this linear speed is much lower. This lack of uniformity of linear agitation speed is believed by the present inventors to have a significantly deleterious impact upon the morphology of the crystals formed during the fractional crystallization process of oils and fats, and upon their behaviour during the subsequent separation stage.

DE 19520675A1 discloses a process for crystallizing substances by cooling of a substance-containing liquid medium in a crystallizer, in particular for crystallizing organic fats from a melt, in which within the crystallizer at least one cooling element is provided for cooling the liquid medium and in which a relative motion is generated between the medium and the cooling element, characterized in that the medium is essentially static relative to a wall of the crystallizer and that the cooling element is subdivided into a plurality of tubular heat transfer elements, which move in closed paths and that all the heat transfer elements are moved essentially with the same speed relative to the medium. DE 19520675A1 further discloses an apparatus in which the cooling unit is moved in relation to the wall of the crystallizer, through a coupling to a drive shaft and the coupling acts as a movement transmission to convert the central rotation of the drive shaft into an off-centre cooling element movement.

BE 877,839A relates to agitated heat exchangers for crystallised syrups. It discloses a vertical cylindrical vessel comprising a heat exchanger spirally arranged in a horizontal plane and to which is imparted a vertical downward and upward motion, and states that this construction allows for a better agitation than that obtained by means of a disc or a rotative blade.

DE 552,532 discloses a crystallization vessel wherein a cooling hollow body and a drive are suspended. The drive imparts to the cooling hollow body a jerky vertical motion or a pendular motion around an axis in a horizontal direction.

GB 2,100,613A discloses producing a metallic slurry in which a metallic material is agitated by a reciprocating agitator. For instance the agitator is a plate or disc and is reciprocated in a direction substantially perpendicular to its major plane.

JP 07-284,643A discloses an agitated vessel for fishery product, said vessel comprising a plate impeller freely detachably hung from a rectilinearly reciprocating slider, wherein the impeller is inclined to the moving direction of said slider. JP 2002-210,399A teaches preventing sedimentation of a solid content in a coating liquid filled in a stirred tank by horizontally reciprocally moving a water-feed panel arranged within said tank, said panel comprising a bent blade material bent to a V-shaped cross section and a bent blade material bent to a reverse V-shaped cross section; in this embodiment, the agitating blades are inclined to the moving direction.

GB 1,424,049 discloses an apparatus suitable for carrying out transformation processes of a non-metallic substance from liquid to solid phase, such as crystallization, comprising a vertically extending hollow reaction chamber having a horizontal cross-sectional shape in the form of a polygon.

DE552532 describes a crystallizer comprising an agitator made of cooling elements moving jerkily back and forth either vertically or horizontally.

SUMMARY OF THE INVENTION

As will be demonstrated in the examples illustrating the invention, it has surprisingly been found, in a first aspect, that during the dry or solvent fractionation of oils and fats one or more of the aforesaid advantages can be achieved when using a crystallizer comprising a crystallization vessel (1,2), an agitator or agitator assembly, and a drive, wherein said drive provides said agitator or agitator assembly with an oscillating motion (e.g. a reciprocating motion) and/or a rotating motion around an axis, with the proviso that the various points of said agitator or agitator assembly move at substantially the same linear speed. A particular feature of this invention is the same linear speed for each point of the agitator or agitator assembly when the latter is provided with a rotating motion around the axis, e.g. a horizontal or a vertical axis. During performance of the fractionation process of the invention, the lower part of the agitator or agitator assembly is immersed within the contents of the crystallization vessel (1,2). A rotating motion according to the present invention includes both a full rotation (i.e. 360° around the axis, clockwise and/or anticlockwise) and a more limited rotation (e.g. a pendular motion). A rotating motion according to the present invention includes a rotation in such a way that each point of the agitator or agitator assembly describes a circle of substantially the same diameter in a vertical or horizontal plane. By substantially the same diameter is meant that the rotation about each point of the agitator or agitator assembly describes a circle in a vertical or horizontal plane whose diameter is within ±10% preferably ±5%, of the average diameter of rotation described by such a point in the agitator or agitator assembly. The edible oil and fat fractionation process of the present invention is not limited to any specific type of agitator assembly construction, or to any combination of agitator motions, provided that at substantially each time of performance of the process each point of the agitator assembly moves at substantially the same linear speed. By substantially each time of performance of the process, it is meant 80% or more of the time of performance, preferably 90% or more of the time of performance of the process. Just as one non-limiting example, the agitator assembly may be provided with an elliptic motion by combining a rotation around an horizontal axis and a vertical translation of said axis.

In a second aspect, the present invention provides novel constructions of crystallizers that are suitable for industries such as, but not limited to, the edible oil or fat industry. In a first embodiment of this second aspect, the crystallizer comprises a crystallization vessel (1,2), an agitator or agitator assembly, and a drive, wherein said drive provides said agitator or agitator assembly with a rotating motion around an axis, and wherein each point of said agitator or agitator assembly moves at substantially the same linear speed.

Within this first embodiment, the crystallization vessel (1,2) preferably has a polygonal cross-section, especially when designed for containing edible oils and fats. In a second embodiment of this second aspect, the crystallizer comprises a crystallization vessel (1,2) having a polygonal cross-section, an agitator or agitator assembly, and a drive, wherein said drive provides said agitator or agitator assembly with an oscillating motion (e.g. a reciprocating motion), and wherein said agitator or agitator assembly is not inclined with respect to the moving direction (contrary to the teaching of the prior art). Within second embodiment, preferably each point of said agitator moves at substantially the same linear speed. Additional optional features of these novel crystallizers are defined in the appended set of claims.

The aforesaid important features of the first and second aspect of this invention are especially useful in the fractionation processes as employed in the oils and fats industry. Crystals grown during a dry fractionation process or solvent fractionation process of edible oil in a crystallizer provided with an agitator or agitator assembly, the various parts of which move at substantially the same linear speed through the crystallizer contents are found to be substantially uniform in size and morphology; this is a totally unexpected finding. By substantially uniform in size is meant apparent uniform size and morphology as assessed visually using photographs taken using a microscope together with filtration rates commensurate with the loose packing associated with crystals of substantially uniform size and morphology Consequently, the crystals are easier to separate from the mother liquor, and the amount of mother liquor retained within the crystals is reduced, thus causing the yield of the filtrate to increase and the fractional crystallization to become more specific.

It has also most unexpectedly been found that a crystallizer according to the invention can handle crystal slurries with a higher solid fat content (hereinafter referred as SFC) than crystallizers of the prior art, which has the great advantage that the crystallizers according to the invention can achieve in a single fractionation step, especially in a dry fractionation process for oils or fats, a result for which the prior art processes needed two or more successive fractionation steps.

Moreover, whereas crystallizers of the prior art all aim at a homogeneity of the crystallizer contents with respect to temperature and/or SFC of the crystal slurry, it has surprisingly been found by performing the present invention that lacking homogeneity with respect to temperature and/or SFC of the slurry does not lead to poor fractionation results. On the contrary, excellent results have been observed in pilot plant crystallizers according to the invention when used for the fractionation of palm oil, displaying both a temperature gradient and sedimentation of the crystals formed. The consequence of this observation is that the process according to the invention suitably lends itself to continuous fractionation processes for edible oils and fats.

The present invention thus provides a fractionation process for edible oils and fats in a crystallizer comprising a crystallization vessel (1,2), an agitator or agitator assembly, and cooling means, the method comprising driving said agitator with an oscillating and/or rotating motion around a horizontal or vertical axis by a driving means, provided that each point of said agitator moves at substantially the same linear speed. In this embodiment, the cooling means may be part of the agitator or agitator assembly, or may be placed between two or more elements of said agitator or agitator assembly, or both.

It is an object of the invention to provide improved crystallization processes for edible oils and fats by using improved crystallizers. An advantage of the present invention is that it can overcome at least one of the disadvantages of the fractional crystallization processes for edible oils and fats using known crystallizers.

An advantage of the present invention is the provision of crystallization process that can effectively be used for the fractional crystallization of a wide variety of fats and oils, and that employs a crystallization vessel displaying little hold-up of crystals upon emptying.

An advantage of the present invention is the provision of improved crystallizers that are easy to construct and maintain, and the design of which can effectively be used, especially in the edible oil and fat industry, for a wide range of capacities without up-scaling problems.

An advantage of the invention is the provision of improved crystallizers with a high cooling surface area per unit of crystallizer volume and with a design that allows this area to be increased or decreased in a manner that does not fundamentally alter the crystallizer performance.

An advantage of the present invention is the provision of a crystallizer with an improved heat transfer coefficient over crystallizers known in the art.

An advantage of the present invention is the provision of a crystallization process for edible oils and fats that allows crystal slurries with a high solids content to be produced and processed in a cost-effective manner.

An advantage of the present invention is the provision of a crystallization process for edible oils and fats that allows crystal slurries to be produced that exhibit superior filtration characteristics.

An advantage of the present invention is the provision of a crystallization process that can be used in both solvent fractionation processes and dry fractionation processes.

An advantage of the present invention is the provision of a batch crystallization process for edible oils and fats making use of one or more crystallizers meeting one or more of the aforesaid improved features.

An advantage of the present invention is the provision of a continuous crystallization process for edible oils and fats making use of one or more crystallizers meeting one or more of the aforesaid features.

Other objects and advantages of the invention will become apparent from the following description, and from the claims.

DETAILED DESCRIPTION OF THE INVENTION

Figure 1:
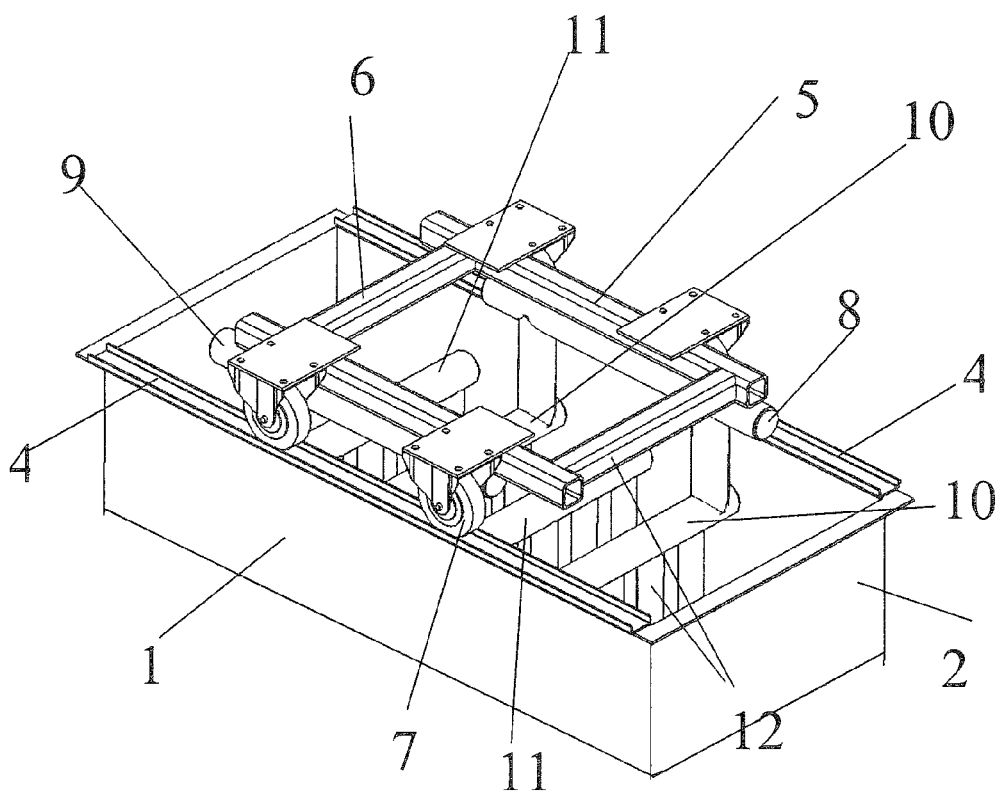
FIG. 1 shows the top part of a first embodiment of a crystallizer for use in fractionation processes according to the invention wherein an agitator or agitator assembly is provided with a linear, horizontal reciprocating motion.

The present invention will be described with respect to particular embodiments and with reference to the drawings but the invention is not limited thereto but only by the claims. The drawings described herein are only schematic and illustrative and non-limiting.

The term "agitator", as used in disclosing the present invention, means an element for agitating oils and/or fats driven by a driving means adapted to provide an oscillating and/or reciprocating and/or rotating motion so that each point of said element moves at substantially the same linear speed during said motion. Parts of the driving means not meant to contact oils and/or fats but fulfilling merely the purpose of providing said oscillating and/or reciprocating and/or rotating motion to said element are not considered part of the agitator. When the term "agitator assembly" is used, it relates to a set of one or more agitators as defined above, wherein each point of each agitator in the agitator assembly moves with substantially the same linear speed during a large part of its motion. In an embodiment, when the agitator or agitator assembly is driven by more than one driving means, it may happen that points of the agitator or agitator assembly are moving at slightly different speed and/or are moving out of phase, so that for a short period of time, the points close to a first driving means move at a speed very different (e.g. at the time when an agitator change direction in a reciprocal movement) than points close to another driving means. This situation could for instance happen in the embodiment of FIG. 5 if the pistons are operating out of phase. This would not however affect very negatively the performance of this embodiment of the present invention and most benefit of the present invention would be maintained. It is therefore an embodiment of the present invention that each point of the agitator/agitator assembly moves at substantially the same speed for 80% or more, more preferably 90% or more of the time of a cycle. Two linear speeds will be considered to be "substantially the same", when their ratio is from 0.8 to 1.2, most preferably form 0.9 to 1.1. Any combination of 1) time fraction range, as described hereabove, wherein the agitator/agitator assembly moves at substantially the same speed and 2) the range of speed ratio, as described hereabove, considered substantially the same are encompassed in embodiments of the present invention.

In an embodiment of the crystallizer, according to the present invention, the crystallizer is exclusive of a crystallizer having at least one cooling element for cooling the liquid medium and in which a relative motion is generated between the medium and the cooling element, wherein the medium is essentially static relative to a wall of the crystallizer, the cooling element is subdivided into a plurality of tubular heat transfer elements which move in closed paths, and all the heat transfer elements are moved essentially with the same speed relative to the medium.

In the fractionation process, according to the present invention, at least 15% of the crystallizer volume is preferably traversed by the agitator or agitator assembly during one movement cycle, with 30% or more being particularly preferred, 50% or more being especially preferred and 70% or more being particularly especially preferred.

According to one embodiment of the fractionation process, according to the present invention, the motion of the agitator or agitator assembly is such that large fluid movements within the oil or fat are reduced. This relative stillness of the slurry contrasts with prior art processes in which movement of the slurry is actively sought to promote heat transfer. The relative stillness may explain the surprising observation of large crystals substantially uniform in size and morphology.

According to another embodiment of the fractionation process, according to the present invention, the crystallizer has a lack of homogeneity with respect to solid fat content of said slurry.

Based on the above-mentioned important findings, a first aspect of the present invention relates to fractionation processes for edible oils and fats making use of a crystallizer comprising a crystallization vessel (1,2), an agitator or agitator assembly, cooling means, and a drive, characterised in that said drive provides said agitator or agitator assembly with an oscillating motion and/or a rotating motion around an axis, such as vertical or horizontal axis, with the proviso that the various points of said agitator or agitator assembly move at substantially the same linear speed, especially when the agitator or agitator assembly is provided with a rotating motion around the said axis. The fractionation process for edible oils or fats according to this invention may be a solvent fractionation process wherein the oil or fat to be fractionated is dissolved in a suitable solvent, or a mixture of suitable solvents, for the relevant oil or fat. The fractionation process for edible oils or fats according to this invention may also be a dry fractionation process wherein the oil or fat to be fractionated is simply molten without addition of a solvent. In a specific embodiment, the present invention relates to a system wherein the cooling means constitute a part of the agitator or agitator assembly, or are included in said agitator or agitator assembly. In another specific embodiment, the present invention relates to a system wherein the cooling means are separate from the agitator or agitator assembly and wherein said cooling means comprises one or more parallel cooling elements that partition said crystallization vessel into compartments and wherein said agitator or agitator assembly is positioned in between said elements. In yet another specific embodiment, the present invention relates to a system wherein said cooling means is both part of said agitator or agitator assembly and comprises one or more parallel cooling elements that partition said crystallization vessel into compartments and wherein said agitator or agitator assembly is positioned in between said elements. In all these specific embodiments, an important feature is that the agitator or agitator assembly is driven in such a way that it has one or more of the three specific types of motion stated above. When the agitator or agitator assembly is driven to have a combination of two or more types of motion stated above, the type of combination is not critical for the present invention. For instance, the agitator or agitator assembly may be provided with an oscillating motion combined, simultaneously or subsequently, with a reciprocating motion. In an alternative embodiment, the agitator or agitator assembly may be provided with an oscillating motion combined, simultaneously or subsequently, with a rotating motion around a horizontal axis wherein the various points of said rotating agitator or agitator assembly move at substantially the same linear speed. In yet an alternative embodiment, the agitator or agitator assembly may be provided with a reciprocating motion combined, simultaneously or subsequently, with a rotating motion around a horizontal axis wherein the various points of said rotating agitator or agitator assembly move at substantially the same linear speed. Depending upon circumstances such as the viscosity and/or type of material to be crystallised, the shape of the crystallization vessel and the like, the skilled person can readily design a suitable combination of motions by merely using the principles of the invention that derive from the above-described unexpected findings.

Figure 2:
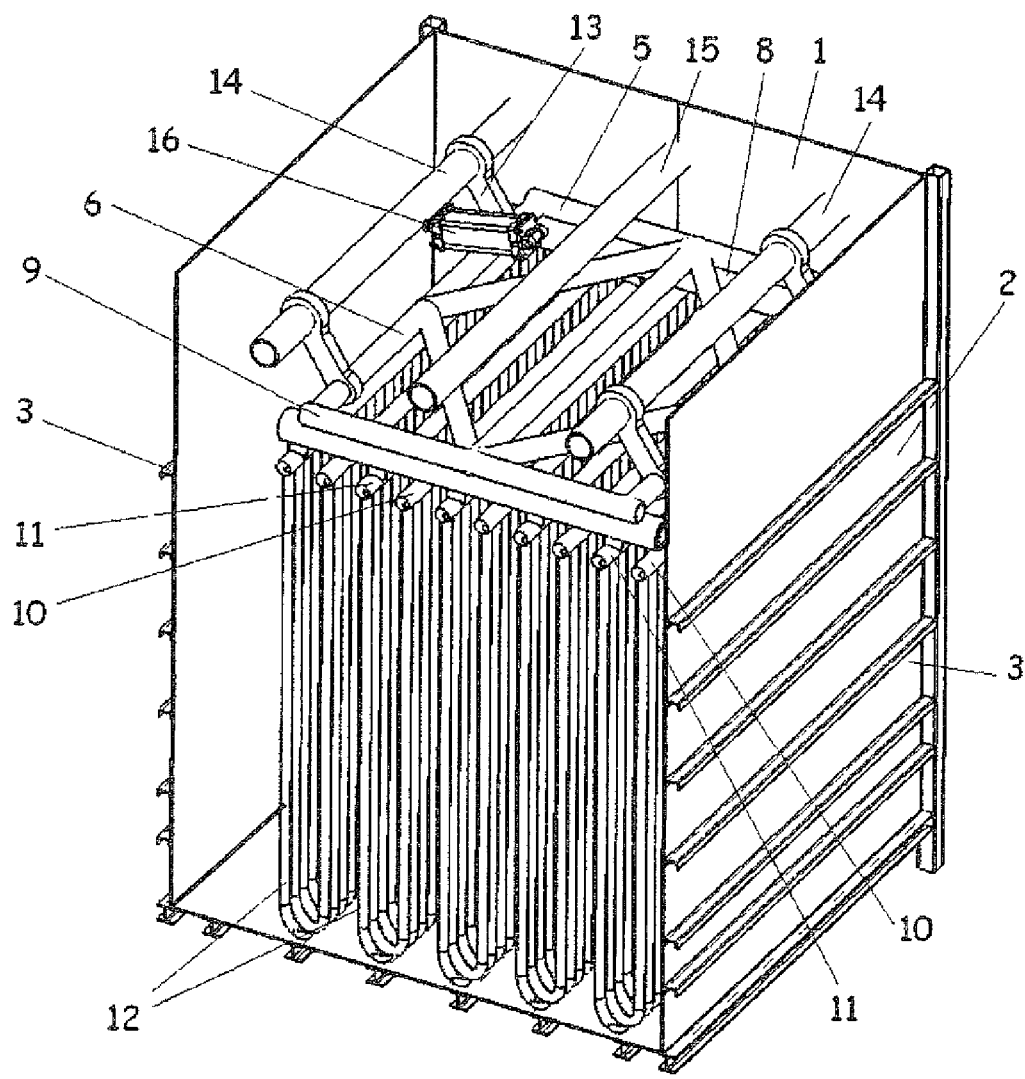
FIG. 2 shows a partially cut away of a second embodiment of a crystallizer for use in fractionation processes according to the invention with an agitator or agitator assembly being provided with an oscillating motion.

Whereas prior art crystallizers used for the dry fractionation of edible oils and fats invariably comprise cylindrical vessels that are often double-walled and thus expensive to construct, the crystallization vessels used in the fractionation processes according to the invention preferably have a polygonal cross-section (wherein the said polygonal cross-section preferably includes from 3 to 8 walls, more preferably from 4 to 6 walls), preferably rectangular as illustrated by FIGS. 1 and 2 or square. For hygienic and product quality reasons, the crystallization vessel of said crystallizer is preferably made of stainless steel. In order to save on this expensive construction material, said crystallization vessel can comprise relatively thin (for instance about 3 or 4 mm in thickness) rectangular walls 1 and 2 that are supported and contained by a cage construction made of mild steel sections 3 as illustrated in FIG. 2. This cage construction can also incorporate two opposite rails 4 running in the longitudinal direction of the crystallization vessel and supporting the agitator or agitator assembly as shown in FIG. 1.

The crystallizer vessel is preferably provided with a feed inlet (not shown in the figures) for the starting material to be crystallised, which can be a solution or a melt, and an outlet (not shown in the figures) for the partially crystallised product resulting from operating the process according to the invention. For the vessel bottom, a slope of about 10 to 30 degrees (depending upon the viscosity and type of material to be crystallised), preferably about 15° with respect to the horizontal, has been found to be adequate to ensure complete emptying of the crystallization vessel by drainage. Several embodiments for constructing a suitable outlet are readily available to those skilled in the art. In one embodiment, the above-mentioned slope continues right to the opposite wall of the vessel, whereas in another embodiment, two bottom halves are directed towards the centre of the crystallization vessel. In addition, the vessel bottom can also be made to have a slope in its longitudinal direction to further facilitate complete emptying of the vessel at the lowest point thereof. The partially cut away wall 1 of the crystallization vessel then has the shape of a rectangular trapezium. The agitator or agitator assembly preferable extends to the sloping bottom so that this can also have a rectangular trapezoidal aspect.

For ease of construction, the crystallization vessel walls 1 and 2 and vessel bottom, or bottom parts, are preferably made from flat sheet material (e.g. stainless steel sheets). A bottom that is curved in one direction and that can therefore also be constructed from a flat sheet constitutes another embodiment of the crystallization vessel to be used in the fractionation process according to the invention. In general, there will be no need for the incorporation of double walls. Proper thermal insulation of walls and bottom will normally ensure proper functioning of said crystallization vessel.

The crystallizer to be used in the fractionation processes for edible oils and fats of this invention is preferably provided with a lid (not shown in FIGS. 1 and 2) in order to prevent dirt from falling into the product being crystallised and/or to thermally insulate this product from its environment. This lid does not need to support any heavy auxiliary equipment like an agitator, so its construction can be quite light. In one advantageous but non-limiting embodiment, the lid is preferably provided with sight-glasses and appropriate lighting. If the crystallizer is used in a solvent fractionation process according to the invention, the lid should preferably be sufficiently air tight to retain the solvent inside the crystallization vessel.

Figure 3:
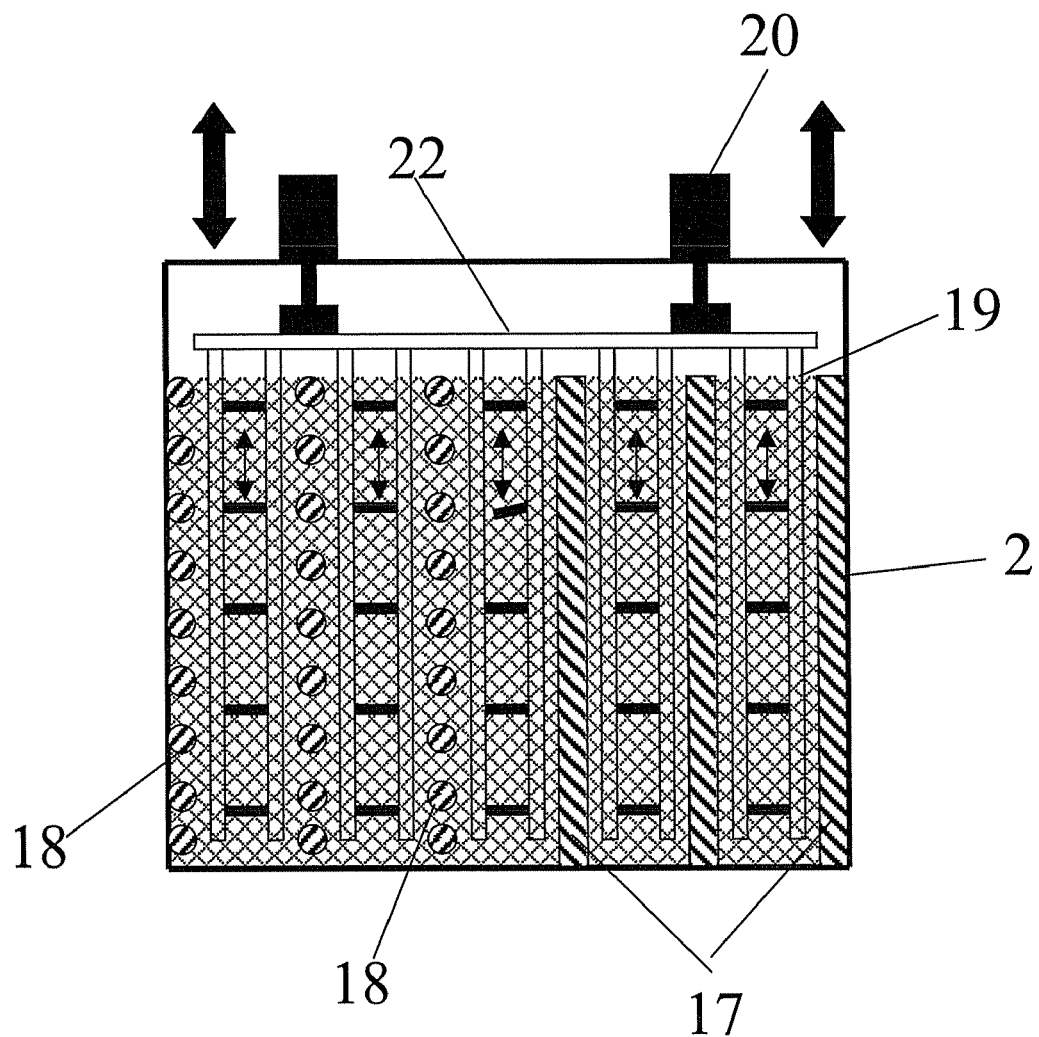
FIG. 3 shows a longitudinal cross section through an embodiment of a crystallizer for use in fractionation processes according to the invention wherein two different types of parallel cooling elements partition the crystallization vessel into compartments and wherein the agitator or agitator assembly is positioned in between said cooling elements and is provided with a reciprocating motion.

One or more of the same or different types of cooling surfaces can be provided together with or incorporated into the crystallizer used in the fractionation processes according to the invention in a number of different approaches. In one such approach (A), the agitator or agitator assembly itself acts as a heat exchanger and comprises a conduit for a heat exchange medium that is connected to an inlet and an outlet for said heat exchange medium. The crystallizer also comprises a drive, and according to the invention, each point of said agitator or agitator assembly moves at substantially the same linear speed when put in motion by said drive. FIGS. 2 and 3 schematically show non-limiting embodiments of approach (A).

Another approach (B) comprises stationary heat exchange elements (i.e. elements able to cool the molten or dissolved edible oil or fat) that may entail the partitioning of the crystallizer (i.e. the crystallization vessel) by hollow elements acting as heat exchangers. Said hollow elements may comprise flat, double-walled heat exchangers that have been provided with an internal labyrinth or a series of parallel hollow tubes. Two embodiments of approach (B) have been illustrated in FIG. 3 that also shows how the elements of the agitator or agitator assembly may be positioned in between these partitioning heat exchange (i.e. cooling) elements.

In a third approach (C) that is a combination of the approaches (A) and (B), both the partitioning elements and the agitator or agitator assembly act as heat exchangers.

The three approaches in the construction of a crystallizer for use in fractionation processes according to the present invention, as described hereinabove, differ in the cooling surface area per unit of crystallization vessel volume and/or in the heat transfer coefficient achieved by the system. The choice of the best suitable approach depends upon the circumstances, inter alia upon parameters such as, but not limited to, the oil or fat to be crystallised, the presence and amount of a solvent and the type of solvent, the cooling requirements of the fractional crystallization process concerned, and the like. Solvent fractionation processes generally permit rapid cooling and thus require both a maximum cooling area per unit of the crystallization vessel volume and a maximum heat transfer coefficient. Consequently approach (A) will often be a suitable choice for use in the performance of a solvent fractionation process according to the invention. If approach (A) does not allow for a sufficiently fast crystallization of a certain material, then approach (C) can be used as a most suitable alternative.

To obtain crystals with favourable filtration characteristics in a dry fractionation process for oils or fats according to the invention, a lower cooling rate is generally preferred, so that approaches (A) and (B) are generally most suited. Approach (B) comprising stationary heat exchange (i.e. cooling) elements will in general provide a lower heat transfer coefficient than approach (A), a difference which can suitably be compensated by correspondingly adapting the cooling surface area. The non-stationary cooling surface of approach (A) is often preferred for crystallizers operating in a continuous fractionation process, e.g. a continuous dry fractionation process, since they minimise the risk of incrustation.

The agitator or agitator assembly, all points of which move according to the invention, at substantially the same linear speed when put in motion by the drive can be executed in various ways without departing from the principles underlying the present invention. In the embodiment according to approach (A) and illustrated in FIG. 1, rails 4 are provided close to or on the top of opposite longitudinal walls 1 of the crystallization vessel and act as a support for the agitator assembly. This assembly comprises a rectangular steel frame having longitudinal portions 5 to which one or more wheels 7 have been fastened, and transverse portions 6 parallel to the transverse walls 2 of the crystallization vessel. These wheels 7 allow the agitator or agitator assembly to be provided with a reciprocating motion along rails 4. The steel frame (5, 6) also supports a conduit for a heat exchange medium. An embodiment of such a conduit as illustrated in FIG. 1 comprises two hollow headers 8 and 9 that are parallel to rails 4 and are connected to the frame (5, 6). The hollow header 8 is connected to a supply source (not shown) of the heat exchange medium, usually water, and the other hollow header 9 is connected to a heat exchange medium return inlet (not shown). Both connections of the hollow headers 8 and 9 should preferably be flexible enough to allow the agitator assembly to move along rails 4.

In the embodiment illustrated in FIG. 1, the two hollow headers 8 and 9 are connected to each other by a series of hollow distributors 10 and 11 in such a way that the hollow distributor 10 is connected to the cooling medium supply header 8 and only supported by the hollow header 9, whereas the hollow distributor 11 is connected to the hollow header 9 and only supported by header 8. The hollow distributors 10 and 11 are connected to each other by U-shaped tubes 12 that extend down to the bottom of the crystallization vessel and ensure proper heat exchange. The heat exchange medium (usually water) thus flows from the hollow header 8 into the first or any odd-numbered hollow distributor 10, through U-shaped cooling tubes 12, into odd-numbered hollow distributors 11, to be collected by the hollow header 9 that is connected to the heat exchange medium return system. Orifice plates can be inserted in the connections between the hollow distributor 11 and the hollow header 9 to ensure that the system is completely filled with heat exchange medium and that the flow rate of said heat exchange medium through each tube or hollow section is approximately the same. In the embodiment illustrated in FIG. 1, the U-shaped cooling tubes can be connected to each other at some lower point to provide rigidity to the agitator or agitator assembly.

Rails 4 allowing motion of the agitator or agitator assembly are preferably not immersed into the oil or fat being crystallised. The hollow headers 8 and 9 are preferably located below the surface of the crystal-containing slurry. Otherwise moisture from the air may condense on these hollow headers, fall down and contaminate the product being crystallised.

FIG. 2 shows another embodiment of an agitator or agitator assembly according to approach (A) of the present invention. In this embodiment, the transversal portions 6 of the rectangular steel frame are connected via swivels 13 to stationary bars 14 that are connected to the walls 1 of a rectangular or square-shaped crystallization vessel. A further stationary bar 15 supports a piston 16 that is also attached to the transverse frame portion 6. Movement of the piston 16 provides the agitator or agitator assembly, comprising hollow headers 8 and 9, hollow distributors 10 and 11 and U-shaped tubes 12 attached to the frame (5, 6), with an oscillating motion in such a way that all points of said agitator or agitator assembly move at substantially the same linear speed.

Although this is not a limiting feature, a crystallizer according to the present invention preferably has a cooling surface in the range of about 2 to 10 $m^2/m^3$, more preferably about 4 to 6 $m^2/m^3$. In the approach (A) of construction, this can easily be achieved by incorporating for instance some 15 U-shaped tubes of 50 mm diameter per square meter of surface of the crystallization vessel. Attaching the U-shaped tubes at 100 mm intervals to the hollow distributors 10 and 11, and spacing the latter at some 350 mm distance achieves the above stated range for the cooling surface. In addition, it provides a sturdy assembly that can easily be moved as a whole even when the U-shaped cooling tubes 12 have been made by bending 6 m long tubes. This example relates to a standard ex-factory length which is commensurate with an industrial crystallizer according to the invention of some 3 m height. Moreover, just as the agitator assembly shown in FIG. 1, the rigidity of the assembly shown in FIG. 2 can also be further ascertained by connecting the cooling tubes 12 to each other at some lower point.

The connection points of the U-shaped cooling tubes 12 to the hollow distributors 10 and 11 can be but need not be staggered. Staggering constitutes a preferred embodiment since it increases the heat transfer coefficient of the crystallizer used in fractionation processes according to the invention. However, the invention is not limited to this embodiment.

Figure 6:
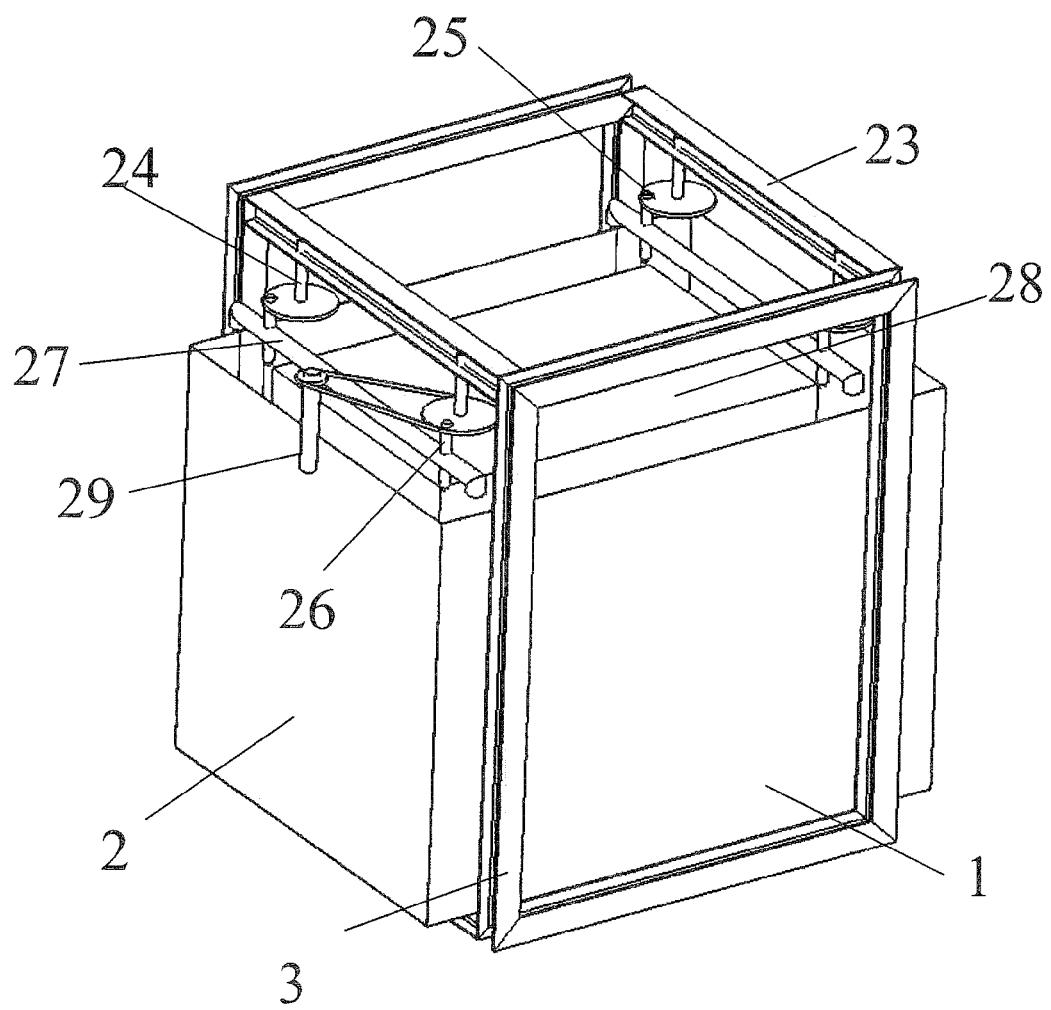
FIG. 6 shows the top part of a further embodiment of a crystallizer for use in the fractionation processes according to the invention wherein the agitator assembly rotates around a vertical axis.

Approach (B) is illustrated by a longitudinal cross section through an embodiment of a crystallizer in FIG. 3. This shows that the partitioning elements may be double-walled dividers 17 as shown on the right hand side of FIG. 3. or horizontal tubular heat exchangers 18 as shown on the left hand side of FIG. 3; these tubes may also be positioned vertically. A distance of about 40 cm between these dividers 17 or 18 also ensures a cooling surface of some 5 $m^2$ per $m^3$ of the crystallization vessel. This distance is sufficient for enabling a rotating motion of agitator elements 19. This rotating motion can be around a horizontal axis as illustrated schematically in FIG. 4B or around a vertical axis as illustrated by FIG. 6. Increasing the distance between dividers 17 or 18 to about 50 cm decreases the cooling surface to 4 $m^2/m^3$, a value which is still within the preferred range of this invention.

Figure 4:
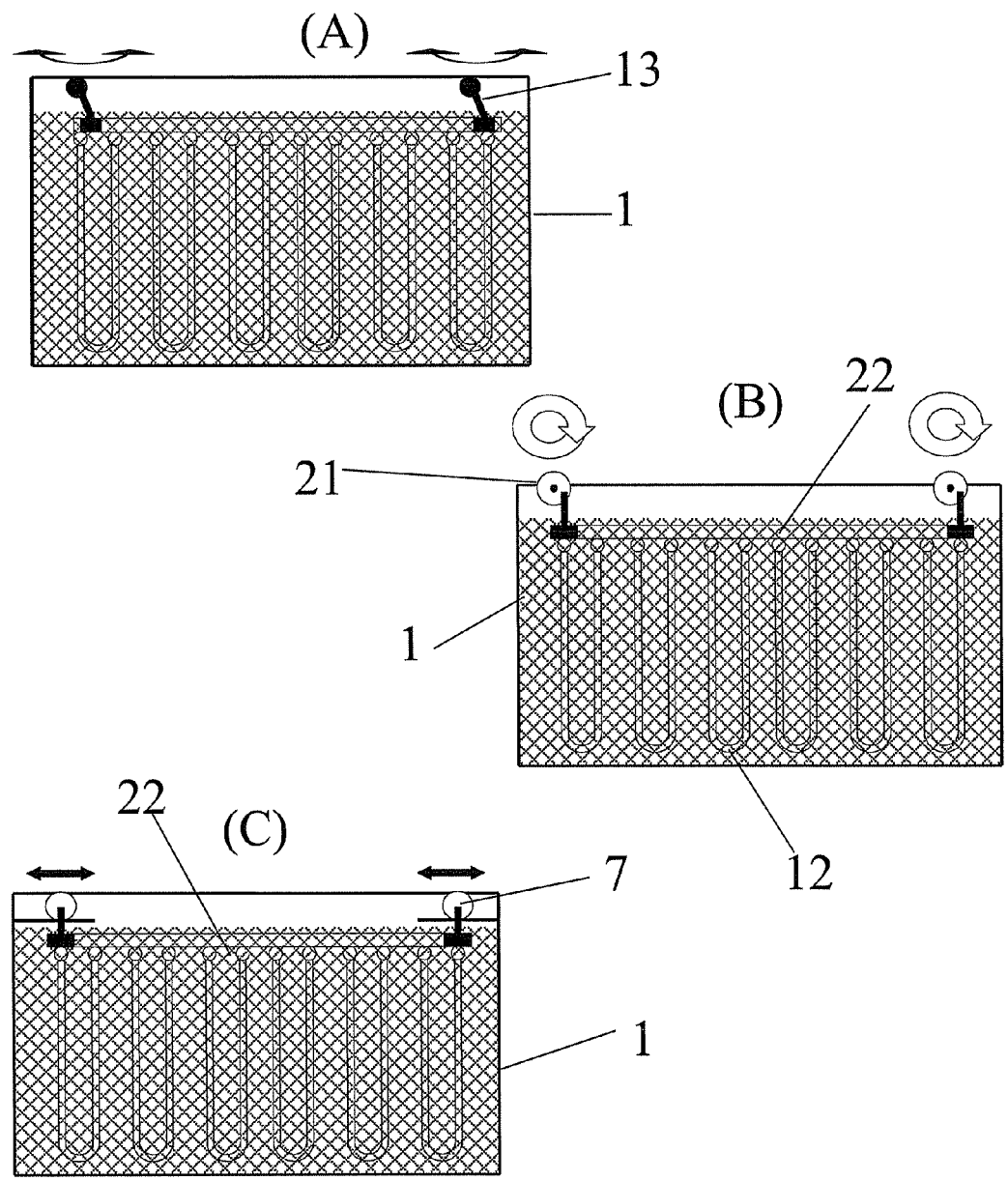
FIG. 4 shows traversal cross-sections through three further embodiments of crystallizers that can be used in fractionation processes according to the invention wherein the agitator or agitator assembly is provided with (A) an oscillating motion, (B) a full rotating motion around a horizontal axis, and (C) a horizontal reciprocating motion, respectively.

In the embodiment according to approach (B) illustrated in FIG. 3, each agitator element 19 is shaped like a gate. It can be attached to pistons 20 that provide the agitator with a reciprocating vertical motion. In another embodiment it can be attached via swivels to a device (such as, but not limited to, a crankshaft, or alternatively eccentric wheels 21 as shown in FIG. 4B) whereby the gate-shaped agitator elements can be attached to each other by frame portion 22 to form an agitator assembly. When the crankshaft is rotated or wheels 21 are rotated, the agitator assembly is provided with a rotating motion around a horizontal axis whereby all points of said agitator assembly move at substantially the same linear speed. Wheels 21 can also be used to provide the agitator with an oscillating motion if so desired.

Another embodiment according to approach (B) comprises partitioning elements comprising a series of parallel, vertical hollow tubes through which the cooling medium flows. This medium can for example be fed via a mains that is situated in a bottom corner of the crystallization vessel and parallel to its longitudinal direction, and that is connected to a series of horizontal distributor pipes that are perpendicular to the mains. Each horizontal distributor pipe can then feed a series of parallel, vertical cooling tubes. These tubes are then connected to a series of collectors whereby these connections may comprise orifice plates to ensure an even distribution of the cooling medium through the cooling tubes. The heat exchange partitioning elements preferably have the cooling medium fed at their lowest point especially when the crystallizer is used in a continuous fractionation process according to the invention, but the invention is in no way limited to this embodiment.

Yet another embodiment of a crystallizer to be used in the process according to the invention is shown in FIG. 6. It illustrates a rectangular crystallization vessel with walls 1 and 2 that is surrounded by mild steel sections 3 that also comprise horizontal bars 23 above the vessel. Extending downward from bars 23 are a number of supports 24, the lower ends of which are provided with a circular disc 25 that is attached to the support 24 by a ball bearing in the centre of the disc 25. Further supports 26 are attached eccentrically to discs 25 and a crossbar 27 is attached to the supports 26. The agitator assembly 28 is attached to crossbars 27 and when one of the discs 25 is made to rotate by drive 29, the whole agitator assembly 28 will rotate around a vertical axis whereby each point of said agitator assembly 28 moves at substantially the same linear speed. Instead of providing a rotating motion, drive 29 could also be a piston so that the resulting periodic motion of agitator assembly 28 will be an oscillating motion around a vertical axis.

Figure 8:
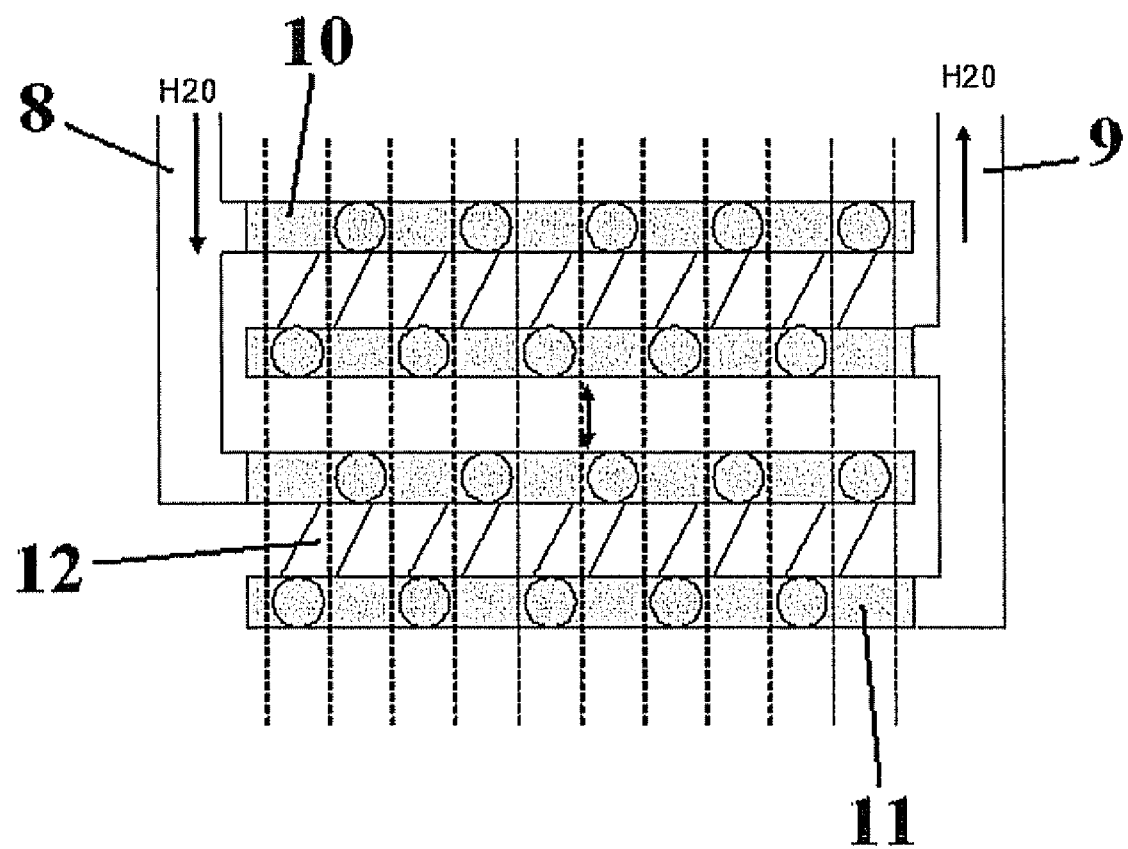
FIG. 8 is an horizontal cross section of a crystallizer according to an embodiment of the present invention.

Yet another embodiment of a crystallizer according to the present invention is displayed as a horizontal cross section in FIG. 8. Cooling water enters the supply header 8 at the left top corner of the drawing which header feeds distributors 10. The U-shaped cooling tubes 12 are indicated in the drawing by circles that are connected by straight lines indicating the top view of U-shaped cooling tubes 12. The water flowing through the cooling tubes 12 is collected by distributors 11 that are connected to header 9 from which the water flows to the cooling unit as shown on the top right hand side of the drawing. The dotted lines in the drawing indicate the areas the cooling tubes 12 traverse when the agitator assembly is moved to and from in a reciprocating manner. In an embodiment, fitting the cooling tubes 12 to the distributors 11 in such a way that the plane containing the central axes of the two vertical portions of a cooling tube 12 is at an angle to the direction of said movement, increases the area of the crystallizer being traversed by the cooling tubes 12.

According to the invention, the motion of the agitator or agitator assembly can also be a reciprocating motion in a horizontal plane as illustrated in FIG. 1 and FIG. 4C wherein for instance a double piston drive ensures this type of motion. This embodiment of the invention is not limited to using a double piston drive, and an electrically driven rotating motion that is converted into a reciprocating motion is also within the scope of the invention. In practice, the double piston drive embodiment has been found effective and adequate by ensuring a reliable operation of the crystallizer and by requiring little maintenance.

In industrial scale crystallizers used in the fractionation processes according to the invention, an amplitude of agitation of about 20 to 100 cm, preferably about 30 to 50 cm, and/or a frequency of agitation of about 5 to 50 $min^{-1}$, preferably about 15 to 30 $min^{-1}$ have been found suitable to ensure a proper heat transfer in most situations and to generate fat crystals that can be easily separated from their mother liquor.

Figure 5:
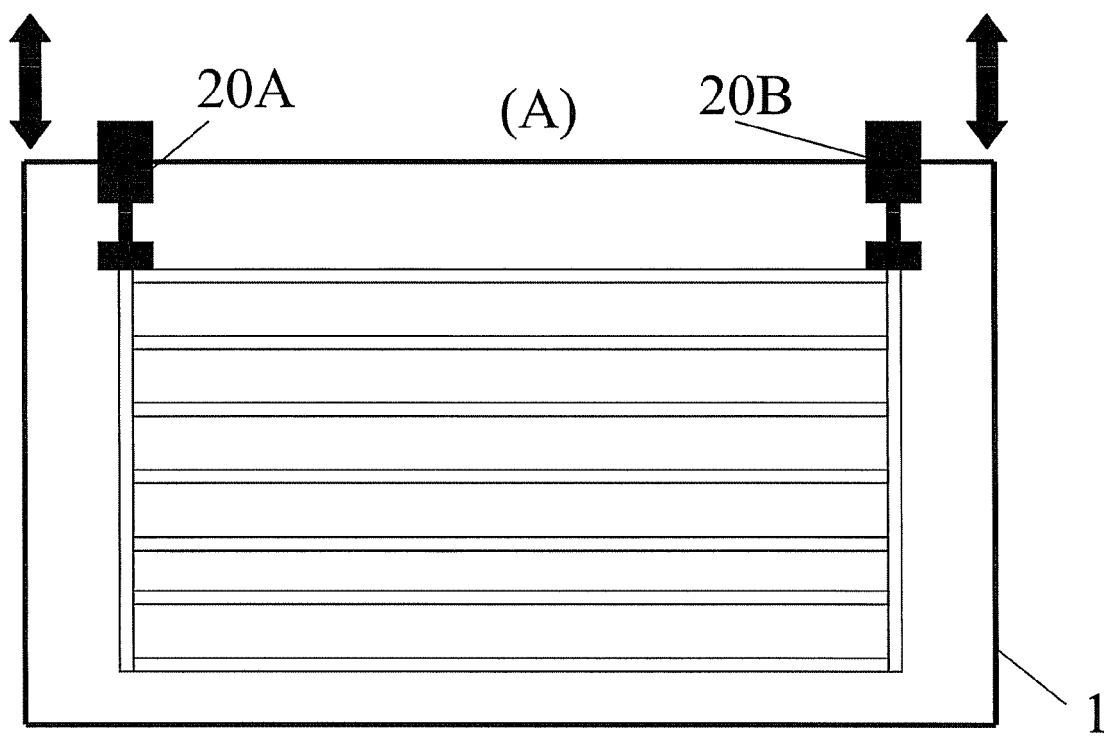
FIG. 5 shows traversal cross-sections through two further embodiments of crystallizers for use in fractionation processes according to the invention wherein the agitator or agitator assembly is provided with a vertical reciprocating motion.
Figure 5:
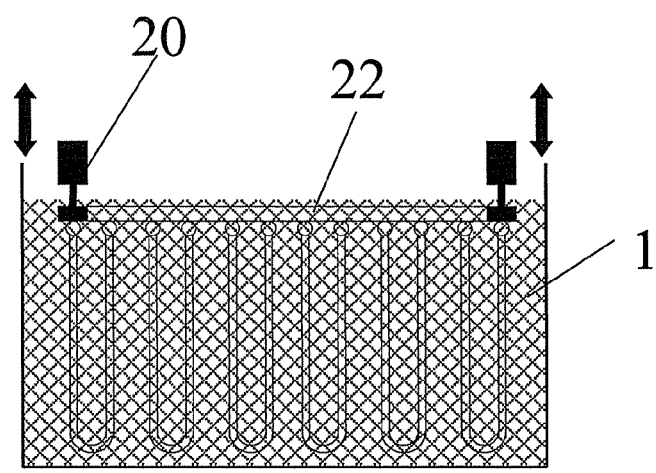

Instead of or in addition to moving the agitator or agitator assembly within a horizontal plane, the agitator or agitator assembly can also be moved up and down within a vertical plane as shown in FIG. 3 and FIG. 5. A combination of these two types of motions is shown in FIG. 4B where the agitator assembly rotates around a horizontal axis; this embodiment can be suitably performed e.g. by attaching the agitator to a crankshaft or eccentrically to wheels 21.

In the embodiment according to approach (B) comprising for instance double-walled partitioning elements, the agitator motion is preferably a reciprocating motion in a vertical direction as illustrated by FIG. 3 and FIG. 5, or a rotating motion around a horizontal axis as illustrated by FIG. 4B. The agitator motion can also be a reciprocating motion in a horizontal direction as shown in FIGS. 1 and 4C, a rotating motion around a horizontal axis as shown in FIG. 4B, or a rotating or oscillating motion around a vertical axis as shown in FIG. 6. A horizontal reciprocating motion parallel to the partitioning elements has also been found to be an effective way of agitation when applied to the crystallization of oils and fats. Combinations of these various periodic motions also fall within the scope of the present invention.

The reciprocating vertical motion shown in FIGS. 3 and 5 shows a drive comprising two pistons. When these pistons operate perfectly in phase, all points of the agitator or agitator assembly move at substantially the same linear speed. The two pistons can also operate slightly out of phase without departing from the present invention. When for example the left hand piston 20A in FIG. 5A is slightly ahead of the right hand piston 20B, the agitator gate will be slightly tilted in an anti-clockwise direction when the pistons are both moving down. After piston 20A has reached its lowest position, it moves upwards again while piston 20B is still moving downwards. This causes the agitator assembly to rotate in a clockwise direction around a horizontal axis. Accordingly, all points of the agitator or agitator assembly move at substantially the same linear speed during most of the time, but not during the short period of time when the pistons are out of phase, which period of time is limited by the clearance between the agitator or agitator assembly and the walls of the crystallization vessel as well as being affected by the length of the piston stroke. This kind of agitator motion must be regarded as within the scope of the invention. Similarly, inertia and lack of absolute rigidity of the agitator assembly will cause some parts of said assembly to continue moving in one direction when the drive forces other parts thereof to move in the opposite direction. Again, this kind of agitator assembly motion must be regarded as within the scope of the invention.

When the agitator or agitator assembly is moved in accordance with the invention, it exerts no net lifting force onto the surrounding slurry so that any crystals the latter contains can easily settle, said crystals having a higher density than oil. In general, we have found that crystals settling is not damaging for fractionation results. If nevertheless the avoidance of crystal settling would be desirable in a specific situation, crystals settling can be effectively avoided by fitting the agitator or agitator assembly with hinged scoops that lift the crystal material when the agitator moves in one direction but do not force it down when the agitator moves in the reverse direction.

The fractionation process according to any of the above-described embodiments of the invention is eminently suitable for the batch dry fractionation of edible oils and fats such as, but not limited to, palm oil. In this batch process, molten oil or fat is introduced into the crystallization vessel and, if any residual crystals stayed behind from the previous batch, these residual crystals easily melt so that a homogenous starting material results. The preferably homogeneous starting material can then be subjected to a cooling regime that may however be preceded by a heating step to erase any crystal memory still present, and comprises one or more gradual cooling periods and possibly one or more temperature holding periods. The number of cooling periods, the cooling rate of each said cooling period, and the duration of each temperature holding period, if any, are not critical to the batch fractionation process of the present invention, and can be determined for each type of oil or fat based on the standard knowledge of the person skilled in the art.

The final batch temperature determines both the olein properties and the amount of crystals produced when equilibrium is reached. In practice, the fractionation process may also be stopped before equilibrium has been reached so that more crystals may be formed in the slurry awaiting the subsequent separation step. The resulting crystal slurry may be held in the crystallization vessel during a waiting stage, but it may also be dropped from the crystallization vessel into one or more intermediate storage vessels serving for feeding the separation equipment of the subsequent separation step. An agitator of a type standard in the art is preferably fitted to this intermediate storage vessel to prevent the crystal slurry from settling before it enters the separation equipment.

In industrial practice, each of a number of crystallization vessels is filled in turn with the material, e.g. the oil or fat, to be crystallised, and when each batch has been crystallised to the desired extent, the contents of each crystallization vessel can then be dropped into an intermediate storage tank. The separation equipment used for separating crystals from their mother liquor can be of any type known in the art, i.e. it can be suitable for continuous operation but it can also be suitable for batch-wise operation.

Figure 7:
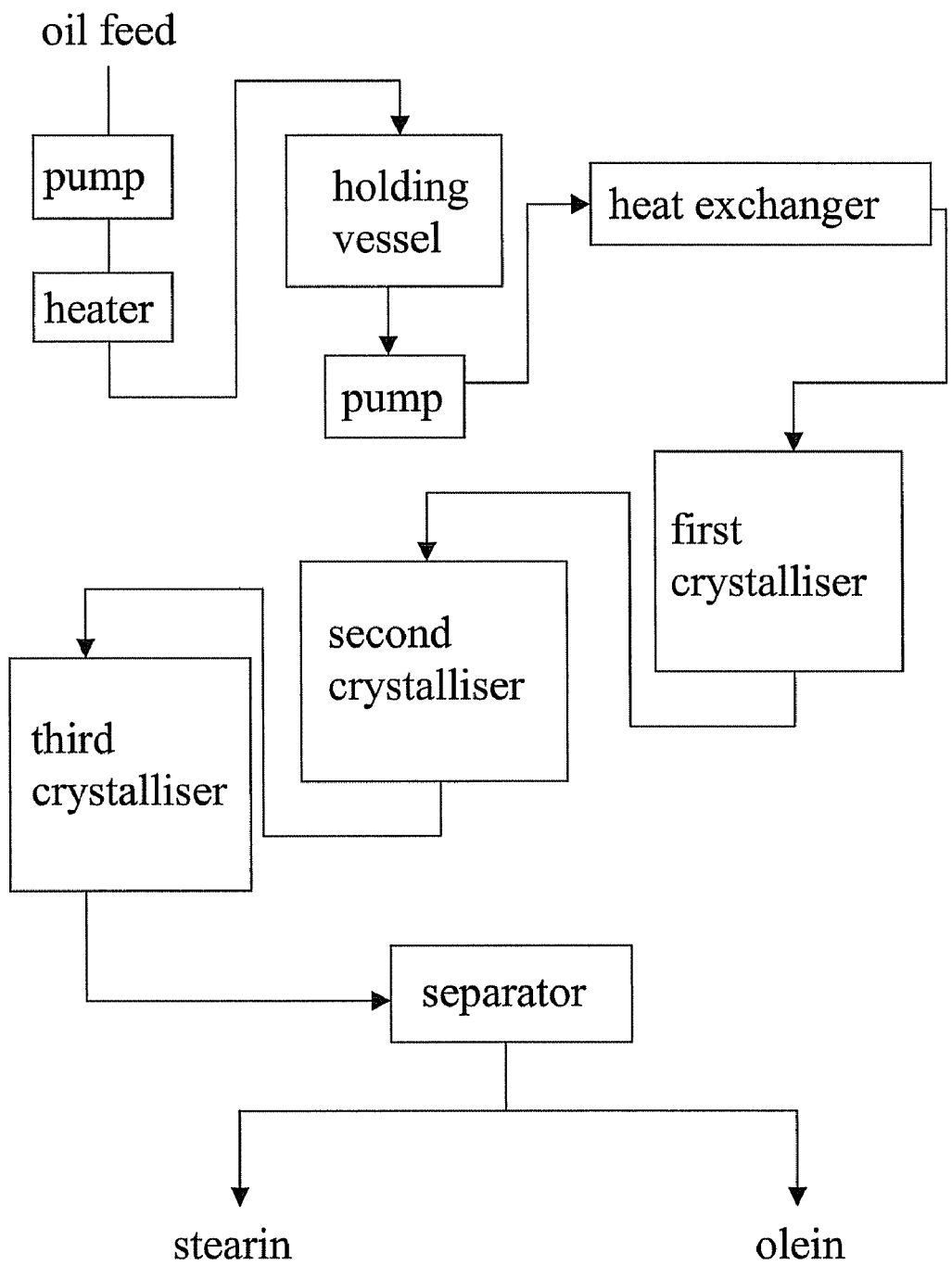
FIG. 7 schematically shows a continuous fractionation process for edible oils according to the invention using a number of crystallizers in series.

The crystallizer according to any of the above-described embodiments of this invention is also suitable for performing a continuous fractionation process of oils and fats, as illustrated in FIG. 7. As shown in the top left portion of this figure, the oil feed stream is first heated and kept in a holding vessel where crystal memory is erased. Because the process is continuous, the energy requirements of the heating and subsequent cooling can be reduced by the use of economisers. The number of crystallizers in series in the continuous fractionation process according to the invention can be three as shown in FIG. 7 as a well-performing but non-limiting example, but more or fewer crystallizers can be used as well to meet special fractionation requirements. Although the first crystallizer can also be used to cool the oil feed stream to about 3 to 8° C. above the temperature at which crystallization is due to commence, this cooling is preferably effected in a heat exchanger upstream from the first crystallization vessel as shown in the top right portion of FIG. 7, for instance a heat exchanger of the tube and shell type well known in the art. Because of the final product temperature aimed for, there is no risk of crystal deposition inside this heat exchanger provided that the temperature difference between the oil product and the coolant (e.g. water) is not too large i.e. less than 1° C.

Each crystallizer used in the continuous dry fractionation process according to the invention comprises a crystallization vessel. The latter comprises a feed inlet that is preferably constructed in such a way that the feed hardly mixes with the vessel contents and remains floating on top of said contents. To this end, horizontal sheets may be provided onto which the feed stream is directed through a multitude of mouths and from where the feed stream flows horizontally into the crystallization vessel, just like cream is spread on top of an Irish coffee by pouring it slowly on the backside of a spoon. Said horizontal sheets are therefore preferably located just below the vessel content surface and they can be conveniently attached to the agitator.

Each crystallization vessel used in the continuous dry fractionation process according to the invention also comprises an outlet that collects material from the lowest part of said vessel. A possible way of controlling the liquid (mother liquor) level in said vessel is by connecting said outlet to a mounting tube that is connected to a bend at the desired level. When then the crystallization vessel is filled, the liquid level in said tube rises until the material starts to overflow into a downstream crystallizer and thus maintains the liquid level at a fixed position. The diameter of said mounting tube must be sufficiently narrow so that the flow rate inside said tube is able to entrain any crystals possibly entering said tube, but not so narrow as to cause a large difference in height between the bend in the tube and the liquid level in the crystallization vessel. Designing the appropriate tube diameter by taking both conflicting requirements into account is within the general knowledge of the person skilled in the art.

When using the crystallizer in a continuous fractionation process according to the invention of oils and fats, the lifting of crystals due to agitator motion is preferably avoided. Accordingly, vertical movement inside the crystallization vessel is preferably minimised. This further allows the highest temperature gradient inside the crystallization vessel to be maintained and permits the use of the lowest possible number of crystallization vessels in series. The last of the crystallizers in series (the third crystallizer shown in FIG. 7) is connected to either a continuously operated separator or to an intermediate storage vessel feeding a discontinuously operated separator like a membrane filter press (not shown in FIG. 7).

The cooling medium (e.g. water) is preferably used in counter-current to the stream of material being crystallised, e.g. (with reference to FIG. 7) with water leaving the third crystallizer feeding the second crystallizer, and so on. To ensure proper temperature control of each crystallizer, the cooling medium (e.g. water) circuit of each crystallizer is preferably provided with independent temperature control means, e.g. by injecting cold water into the cooling water stream.

Example 1

Refined, bleached and deodorised (hereinafter referred as RBD) palm oil with an iodine value (hereinafter referred as IV) of 52.7 was used for feeding a crystallizer of the type shown in FIG. 1. The rectangular crystallization vessel is 80 cm high, 45 cm wide and 100 cm long. Inside this vessel, an agitator suitable for horizontal motion was fitted as shown in FIG. 1. The agitator comprises two sets of 5 U-shaped tubes each assembled together. These tubes (diameter 33 mm) extend almost down to the bottom of the crystallization vessel. Accordingly, the cooling surface is about 2 $m^2$ and the cooling surface to volume ratio is about 5.6 $m^2/m^3$.

The crystallization vessel was filled with molten RBD palm oil that was then heated to 70° C. over a period of 30 minutes and held at that temperature for 15 minutes to erase any crystal memory. Cooling parameters used during each step of the RBD palm oil crystallization process are reported in table 1 below.

TABLE 1

| Time (min) | Step | Operation | Duration (min) | Temperature (° C.) |
|---|---|---|---|---|
| 0 | 1 | cooling | 15 | 70 down to 37 |
| 15 |   | isotherm | 45 | 37 |
| 60 | 2 | cooling | 10 | 37 down to 26 |
| 70 |   | isotherm | 60 | 26 |
| 130 | 3 | cooling | 20 | 26 down to 22 |
| 150 |   | isotherm | 40 | 22 |
| 190 | 4 | cooling | 10 | 22 down to 19 |
| 200 |   | isotherm | 80 | 19 |
| 280 | 5 | cooling | 20 | 19 down to 15 |

TABLE 1-continued

| Time (min) | Step | Operation | Duration (min) | Temperature (° C.) |
|---|---|---|---|---|
| 300 | | isotherm | 160 | 15 |
| 460 | 6 | cooling | 20 | 15 down to 13 |
| 480 | | isotherm | 180 | 13 |
| 660 | 7 | cooling | 20 | 13 down to 10 |
| 680 | | isotherm | 80 | 10 |
| 760 | 8 | emptying | 30 | 10 |

During this crystallization experiment, cooling water temperature and palm oil temperature were measured regularly. Samples were taken at the top of the crystallization vessel, at an intermediate height about one third from the bottom thereof, and at the bottom of the crystallization vessel. The Solid Fat Content (hereinafter referred as SFC and expressed as a weight percentage) of some samples was determined by pulse-NMR (using a Bruker Minispec MQ20 spectrometer) and is reported in tables 2 and 3 below. Olein was isolated from some samples by vacuum filtration (using a Buchner funnel) to permit its iodine value to be determined.

Crystal formation was first observed during step 2 when the SFC-value of the slurry increased to 1.1%. Table 2 shows SFC-values measured shortly before the end of each step. Table 2 below shows the evolution of product properties and temperature characteristics after each crystallization step.

TABLE 2

| Time (min) | Step | Temperature cooling water (°) | Temperature oil (° C.) | SFC of slurry (%) |
|---|---|---|---|---|
| 123 | 2 | 26.5 | 27.5 | 1.1 |
| 184 | 3 | 21.0 | 24.0 | 5.4 |
| 271 | 4 | 18.4 | 21.1 | 12.4 |
| 455 | 5 | 15.3 | 17.0 | 19.5 |
| 620 | 6 | 12.7 | 15.8 | 27.2 |
| 715 | 7 | 10.1 | 14.8 | 30.9 |

Table 2 shows that:
the evolution of oil temperature follows that of cooling water temperature, but always at a certain distance in time;
more and more crystals were formed when temperature was lowered, and
the crystallizer for use in the process according to the invention was able to handle a crystal slurry with an SFC of about 31% by weight.

Table 3 below shows SFC values of slurry samples and IV values of olein samples taken at different levels of the crystallization vessel after two different steps of the crystallization process.

TABLE 3

| | Sampling time | |
|---|---|---|
| | 388 | 734 |
| During step | 5 | 7 |
| SFC at top of vessel | 14.2 | 29.8 |
| SFC at intermediate level | 18.1 | 29.1 |
| SFC at bottom of vessel | 21.0 | 28.5 |
| IV slurry at top of vessel | 53.05 | 52.77 |
| IV slurry at bottom of vessel | 52.11 | 52.93 |
| IV olein at top of vessel | 59.22 | 62.87 |
| IV olein at bottom of vessel | 59.20 | 63.04 |

Table 3 shows that:
the agitator assembly does not prevent crystals from settling, since at 388 minutes (during step 5) the SFC of the slurry increased from the top of the vessel to the bottom of the vessel. This is also reflected in the iodine values of the slurry which decreased slightly;
when the temperature was lowered and more crystals were formed, the SFC-difference between the top and the bottom of the vessel decreased and at 734 minutes (during step 7) it had almost disappeared, and the crystal slurry had become so thick that it hardly settled on standing;
the IV of the olein does not change significantly from top to bottom of the vessel; and
a palm olein with an IV of about 63 can be produced from RBD palm oil in a single fractionation step.

Example 2

A commercial palm olein with an IV of 57.7 was used as raw material. If this olein is used as such, the crystal slurry produced by cooling the olein is already quite viscous when its SFC is still only 16% by weight. Filtering this viscous slurry by using a membrane filter press yields a filter cake with an SFC of only 38% by weight at a cake thickness of 50 mm. The SFC of the cake can be increased to 45% by weight when the cake thickness is reduced to 25 mm but in both cases the IV of the olein was only 61.5.

A much higher olein IV can be obtained by improving crystallization by adding 8% by weight of palm oil to the palm olein before this is heated to 60° C. and then cooled in the crystallizer according to the invention and as used in Example 1. The resulting slurry had an SFC of 24.3% by weight after having been cooled down to 14° C. over a period of 13 hours and yielded 60% by weight of an olein with an IV of 65.4. The corresponding stearin fraction had an IV of 46.6.

Example 3

In this example, a particular embodiment of the process according to the invention and comprising the continuous operation of a crystallizer will be illustrated. 1,000 kg of palm oil with an IV of 52.2 was stored in a storage vessel where the oil temperature was maintained at 70° C. by means of an electrical heating element. The oil was pumped at a rate of 60 kg/h, via a heat exchanger that lowered its temperature to 45° C., into a crystallizer vessel as shown in FIG. 1. A level controller actuating the crystallising vessel outlet valve ensured a constant crystallizer content.

When a cooling water temperature of 30° C. was maintained, a steady state arose with an oil temperature of 32° C. at the top and 30° C. at the bottom of the crystallization vessel. The outlet stream had an SFC of 5% by weight and could easily be filtered to yield a cake with an SFC of 48% by weight by vacuum filtration, or a cake with an SFC of 60% by weight by pressure filtration. The IV-values of three different olein samples were 55.9, 55.5 and 55.8 and the IV values of the corresponding three stearin samples were 27.4, 28.4 and 28.1. This indicates that the process was quite stable.

When the cooling water temperature was lowered to 27° C., the temperature profile of the crystallization vessel changed in that at the top it was lowered to 30.5° C. and to 27° C. at the bottom. The SFC of the slurry increased to 8.5% by weight, the IV of olein increased to 57.0 and the IV of stearin samples increased to about 31.5.

This example demonstrates that palm oil crystallization leading to easily filterable crystals is possible even when there is a temperature difference between the top and the bottom of the crystallization vessel corresponding to a temperature gradient of 2-3° C./m. Accordingly, the temperature difference between the inlet and the outlet of an industrial crystallizer with a height of about 3 m can easily reach at least 8° C. This means that in most cases only three such crystallizers in series are required to cover the entire cooling range from the oil cloud point to the filtration temperature of the crystal slurry.

What is claimed is:

1. A dry fractionation process for edible oils and fats comprising the steps of:
    a) melting the oil or fat to be fractionated;
    b) cooling the molten oil or fat in a crystallizer having a crystallization vessel (1,2), an agitator or agitator assembly, a cooling means as a part of said agitator or agitator assembly, and a drive, thereby generating a slurry of crystals in a mother liquor; and subsequently
    c) separating said crystals from said mother liquor,
    whereby said drive provides said agitator or agitator assembly with an oscillating motion with the proviso that each point of said agitator or agitator assembly moves at substantially the same linear speed, said agitator or agitator assembly exerting only minimal lifting movement on said slurry.

2. The fractionation process for edible oils and fats according to claim 1, wherein said crystallization vessel (1,2) has a polygonal cross section.

3. The fractionation process for edible oils and fats according to claim 1, wherein the bottom of said crystallization vessel (1,2) has a slope of 10 to 30 degrees with respect to the horizontal.

4. The fractionation process for edible oils and fats according to claim 1, wherein said cooling means is part of said agitator or agitator assembly and wherein said cooling means comprise a conduit for a heat exchange medium connected to an inlet and an outlet for said heat exchange medium.

5. The fractionation process for edible oils and fats according to claim 1, wherein said cooling means has one or more parallel cooling elements that partition said crystallization vessel (1,2) into compartments, and wherein said agitator or agitator assembly is positioned in between said cooling elements.

6. The fractionation process for edible oils and fats according to claim 4, wherein said one or more cooling elements comprise a number of parallel tubular conduits for circulating a heat exchange medium.

7. The fractionation process for edible oils and fats according to claim 1, in which said oscillating motion is a horizontal linear reciprocating motion.

8. The fractionation process for edible oils and fats according to claim 7, wherein the crystallization vessel (1,2) has an even number of walls, and wherein said horizontal linear reciprocating motion is parallel to two opposite walls of said crystallization vessel.

9. The fractionation process for edible oils and fats according to claim 1, in which said oscillating motion is a vertical linear reciprocating motion.

10. The fractionation process for edible oils and fats according to claim 1, in which the rotating motion is around a horizontal axis.

11. The fractionation process for edible oils and fats according to claim 1, in which the rotating motion is around a vertical axis.

12. The fractionation process for edible oils and fats according to claim 1, in which the oscillating motion is around a horizontal axis.

13. The fractionation process for edible oils and fats according to claim 1, in which the oscillating motion is around a vertical axis.

14. The fractionation process for edible oils and fats according to claim 13, wherein said agitator or agitator assembly is suspended from one or more devices that, upon action of said drive, provide said agitator or agitator assembly with an oscillating motion.

15. The fractionation process for edible oils and fats according to claim 1, characterised in that said drive is a hydraulic drive comprising one or more pistons.

16. The fractionation process for edible oils and fats according to claim 1, wherein said drive comprises one or more electric motors.

17. The fractionation process for edible oils and fats according to claim 1, characterised in that the amplitude of the motion provided to the agitator or agitator assembly is from 20 to 200 cm.

18. The fractionation process for edible oils and fats according to claim 1, wherein the frequency of the motion provided to the agitator or agitator assembly is from 5 to 50 per minute.

19. The fractionation process for edible oils and fats according to claim 1, wherein the edible oil is palm oil, being performed batch-wise until said mother liquor has reached an iodine value of at least 60 and up to 72 g $I_2$/100 g fat.

20. The fractionation process for edible oils and fats according to claim 1, being operated continuously.

21. The fractionation process for edible oils and fats according to claim 20, wherein said crystallizer comprises a number of crystallizers in series.

22. The fractionation process for edible oils and fats according to claim 21, wherein the difference in temperature between the outlet of one crystallizer and the inlet of another crystallizer to which it is connected is less than 1° C.

23. A solvent fractionation process for edible oils and fats comprising the steps of:
    dissolving the oil or fat to be fractionated in a solvent;
    cooling the solution of said oil or fat in a crystalliser comprising a crystallisation vessel (1,2), an agitator, a cooling means being a part of said agitator, and a drive, thereby generating a slurry of crystals in a mother liquour; and subsequently
    separating said crystals from said mother liquour, whereby said drive provides said agitator or agitator assembly with an oscillating motion with the proviso that each point of said agitator or agitator assembly moves at substantially the same linear speed, said agitator assembly exerting only minimal lifting movement on said slurry.

* * * * *